(12) United States Patent
Bower et al.

(10) Patent No.: US 7,303,184 B1
(45) Date of Patent: Dec. 4, 2007

(54) ISOLATOR MOUNT FOR SHOCK AND VIBRATION MITIGATION

(76) Inventors: Bruce Bower, 4121 Jacks Hollow Rd., Williamsport, PA (US) 17702; Gareth Knowles, 2131 Wheatland Ave., Williamsport, PA (US) 17701

( * ) Notice: Subject to any disclaimer, the term of this patent is extended or adjusted under 35 U.S.C. 154(b) by 0 days.

(21) Appl. No.: 11/519,247

(22) Filed: Sep. 12, 2006

Related U.S. Application Data

(60) Continuation-in-part of application No. 11/111,370, filed on Apr. 21, 2005, now abandoned, which is a division of application No. 10/188,446, filed on Jul. 2, 2002.

(60) Provisional application No. 60/302,579, filed on Jul. 2, 2001.

(51) Int. Cl.
*F16M 1/00* (2006.01)
(52) U.S. Cl. .................. 267/136; 267/148; 267/151
(58) Field of Classification Search .......... 267/34, 267/136, 140–141.7, 378, 152, 153, 148, 267/151
See application file for complete search history.

(56) References Cited

U.S. PATENT DOCUMENTS

| | | | | |
|---|---|---|---|---|
| 4,278,726 A * | 7/1981 | Wieme | ............. | 428/300.7 |
| 4,566,231 A * | 1/1986 | Konsevich | ............. | 52/145 |
| 5,030,490 A * | 7/1991 | Bronowicki et al. | ....... | 428/36.4 |
| 5,042,783 A * | 8/1991 | Ciolczyk et al. | ............. | 267/81 |
| 5,087,491 A * | 2/1992 | Barrett | ............. | 428/34.5 |
| 5,102,107 A * | 4/1992 | Simon et al. | ............. | 267/152 |
| 5,139,120 A * | 8/1992 | Gomi | ............. | 188/378 |
| 5,203,435 A * | 4/1993 | Dolgin | ............. | 188/322.5 |
| 5,358,210 A * | 10/1994 | Simon et al. | ............. | 248/628 |
| 5,712,038 A * | 1/1998 | Yamazaki et al. | ....... | 428/411.1 |
| 5,750,272 A * | 5/1998 | Jardine | ............. | 428/686 |
| 5,858,521 A * | 1/1999 | Okuda et al. | ............. | 428/219 |
| 5,906,254 A * | 5/1999 | Schmidt et al. | ............. | 188/378 |
| 6,102,379 A * | 8/2000 | Ponslet et al. | ............. | 267/136 |
| 6,126,371 A * | 10/2000 | McCloskey | ............. | 411/82.5 |
| 6,175,989 B1 * | 1/2001 | Carpenter et al. | ............. | 16/225 |
| 6,254,070 B1 * | 7/2001 | Runge | ............. | 267/152 |
| 6,524,692 B1 * | 2/2003 | Rosen | ............. | 428/298.4 |
| 6,530,182 B2 * | 3/2003 | Fanucci et al. | ............. | 52/167.3 |
| 6,695,296 B1 * | 2/2004 | Runge | ............. | 267/160 |

* cited by examiner

*Primary Examiner*—Christopher P. Schwartz
(74) *Attorney, Agent, or Firm*—Michael Crilly, Esq.

(57) ABSTRACT

A passive isolator mount capable of dissipating shocks and vibrations as either heat or magnetic energy is presented. The passive isolator includes a pair of L-shaped or C-shaped brackets capable of withstanding repeated deflections and strains, energy dissipating layers disposed along each bracket, and a bond layer. The energy dissipating layers are composed of a rare earth element or alloy, a ferromagnetic shape alloy, a magnetic shape memory alloy, a magneto-strictive alloy, a magneto-mechanical alloy, a super-elastic alloy, or a combination thereof. The bond layer is disposed between and adheres one energy dissipating layer along a first bracket to an energy dissipating layer along a second bracket so that the resultant passive isolator is C-shaped. Energy dissipating and bond layers completely bisect the passive isolator either widthwise through the thickness of the L-shaped brackets or lengthwise through the thickness of the C-shaped brackets.

12 Claims, 4 Drawing Sheets

ISOLATOR MOUNT FOR SHOCK AND VIBRATION MITIGATION

CROSS-REFERENCE TO RELATED APPLICATIONS

This application is a continuation-in-part application of U.S. Non-Provisional application Ser. No. 11/111,370, filed Apr. 21, 2005 now abandoned, which is a divisional application of co-pending U.S. Non-Provisional application Ser. No. 10/188,446, filed Jul. 2, 2002, and claims the benefit of U.S. Provisional Application No. 60/302,579, filed Jul. 2, 2001. The subject matters of the prior applications are incorporated in their entirety herein by reference thereto.

FEDERALLY SPONSORED RESEARCH OR DEVELOPMENT

None.

BACKGROUND OF THE INVENTION

1. Field of the Invention

The present invention generally relates to an isolator mount. Specifically, the isolator mount includes a plurality of energy dissipating elemental and/or alloy layers which bisect the mount so as to impede and dissipate shocks and vibrations which traverse the mount.

2. Related Arts

Naval ships employ a wide variety of isolator mounts to impede acoustic transmissions and to protect sensitive equipment from shocks and vibrations. Isolator mounts are specifically designed for a limited range of shocks and vibrations. As such, a variety of mounts are required to mitigate and dissipate a wide range of mechanical load conditions.

Furthermore, energy dissipation mechanisms employed within presently known devices quickly degrade with use thereby requiring frequent replacement. For example, passive mounts comprised of rubber and metal rapidly lose their damping capacity in ship-based applications. Consequently, isolator mounts are often used well beyond their effective lifetime, thereby compromising the integrity and performance of shipboard systems.

Therefore, what is required is a robust isolator mount capable of passively damping shocks and vibrations over a wide range of temperature and load conditions typically encountered in ship-based applications.

SUMMARY OF THE INVENTION

An object of the present invention is a robust passive damping device capable of mitigating shocks and vibrations over a wide range of temperature and load conditions typically encountered in ship-based applications.

The present invention includes a pair of L-shaped or C-shaped brackets capable of withstanding repeated deflections and strains, at least two energy dissipating layers composed of a rare earth element or alloy, a ferromagnetic shape alloy, a magnetic shape memory alloy, a magneto-strictive alloy, a magneto-mechanical alloy, a super-elastic alloy, or a combination thereof disposed along one side of each bracket, and a bond layer. Brackets include two or more holes allowing attachment of the passive isolator to a mounting surface or a shipboard component via fasteners. The bond layer adheres one energy dissipating layer along a first bracket to an energy dissipating layer along a second bracket to form the C-shaped structure. Energy dissipating layers and bond layer bisect the passive isolator either widthwise across the thickness of the L-shaped brackets or lengthwise across the thickness of the C-shaped brackets.

Energy dissipating layers include a variety of elemental metals and alloys. For example, magneto-mechanical and magnetostrictive materials couple mechanical energy to magnetism; whereas, super-elastic alloys couple mechanical energy to heat.

Magneto-mechanical passive damping is applicable to shocks and vibrations. For example, magnetic iron alloys are not only durable but also transform elastic energy into magnetic energy. A high-loss factor ensures less energy is returned to the load transfer path and the shock or vibration is damped. The primary loss phenomenon is energy dissipation via hysteresis, generally independent of frequency but strongly dependent upon amplitude.

Super-elastic damping is applicable to shock mitigation. Super-elastic alloys function as a high-loss damping material; however, the strain required for damping is too large for some applications. Super-elastic damping is appropriate for ship-based shock mitigation because several inches of displacement are common. The stress cycle of a super-elastic alloy involves a large elastic hysteresis which transforms elastic mechanical energy into heat without significantly raising the temperature of the damping material.

A variety of smart alloys, which produce a change of dimension, shape, or stress in response to an applied magnetic field, are applicable to the present invention. Exemplary materials include magnetostrictive alloys and magnetic shape memory (MSM) alloys. Magnetostrictive alloys may be formed by mixing one or more powdered magnetic materials, examples including but not limited to Terfenol-D, SmPd, $SmFe_2$, and CbFe. MSM alloys combine the large and complex shape changes of shape memory alloys and the fast and precise response of magnetic control.

Other materials applicable to the present invention include ferromagnetic shape alloys (FMSA). FMSAs include high-magnetization alloys of Fe—Ni—Co having a large hysteresis, hence large loss and damping. Fe-based FMSAs are less expensive, have a broader temperature range, and are a higher authority alternative to Ni—Mn—Ga alloys.

The present invention is a durable isolation mount suitable to a wide variety of shock and vibration applications.

BRIEF DESCRIPTION OF THE DRAWINGS

The invention will now be described in more detail, by way of example only, with reference to the accompanying drawings, in which.

REFERENCE NUMERALS

Figure 1:
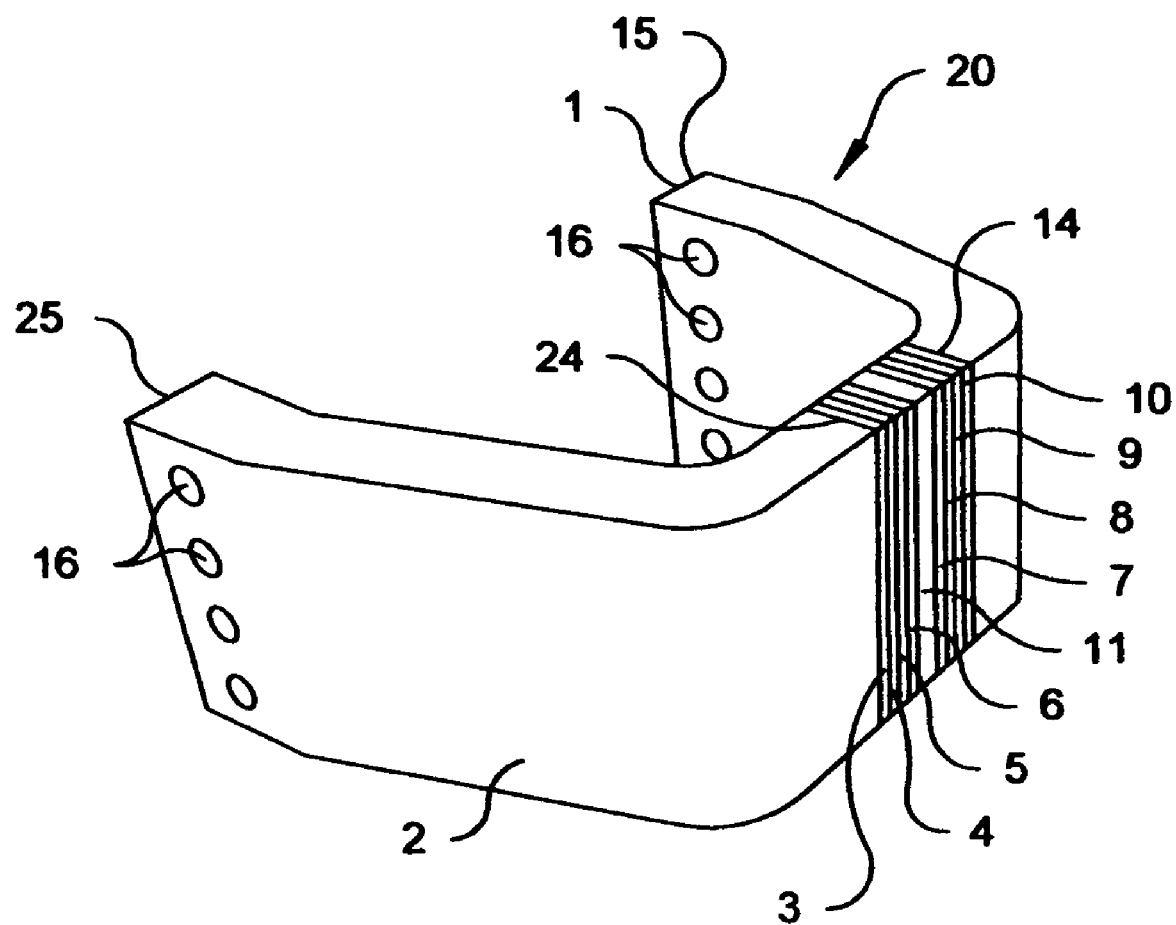
FIG. 1 is a perspective view of one embodiment of the present invention including a plurality of layers composed of two or more energy dissipating materials disposed about a bond layer and forming a C-shaped mount composed of two L-shaped brackets.

1 First L-shaped bracket
2 Second L-shaped bracket
3-10 Energy dissipating layer
11 Bond layer
12 First C-shaped bracket 13 Second C-shaped bracket
14 First end
15 Second end
16 Holes
17 First side
18 Second side
19 Second side
20 C-mount isolator
21 Shipboard component
22 Mounting surface
23 First side
24 First end
25 Second end
26 First outer layer
27 Second outer layer
28 Laminate C-mount isolator
29 Fastener

DESCRIPTION OF THE INVENTION

Referring now to FIG. 1, a C-mount isolator 20 is shown for one embodiment of the present invention including a plurality of energy dissipating layers 3-10 which completely bisect the C-mount isolator 20 along the width of the C-mount isolator 20. Although eight energy dissipating layers 3-6 and 7-10 are shown disposed about the bond layer 11 in FIG. 1, embodiments may include two or more such layers.

The C-mount isolator 20 comprises a first L-shaped bracket 1 and a second L-shaped bracket 2 with two or more energy dissipating layers 3-10 and a bond layer 11 disposed there between. First and second L-shaped brackets 1, 2 are arranged in a symmetrical fashion about the energy dissipating layers 3-10 and bond layer 11 to achieve the C-shaped structure of the C-mount isolator 20.

Energy dissipating layers 7-10 and 3-6 are applied onto the first and second L-shaped brackets 1, 2, respectively, via methods understood in the arts. The first L-shaped bracket 1 includes one or more energy dissipating layers 7-10 deposited and adhered to the edge in a layered fashion at the first end 14 of the first L-shaped bracket 1. The second L-shaped bracket 2 includes one or more energy dissipating layers 3-6 deposited and adhered to the edge in a layered fashion at the first end 24 of the second L-shaped bracket 2. Energy dissipating layers 3-10 are generally planar structures which cover the edge surface adjacent to the first end 14, 24 of the first and second L-shaped brackets 1, 2, as represented in FIG. 1. As such, energy dissipating layers 3-10 completely bisect the C-mount isolator 20 widthwise through the thickness of the first and second L-shaped brackets 1, 2.

Energy dissipating layers 3-10 are preferred to be composed of rare earth materials in either elemental or alloy form. Energy dissipating layers 3-10 may be composed of one or more elemental or alloy materials sequentially layered to form a rigid structure which extends from the first ends 14, 24. For example, preferred embodiments of the present invention may include elemental forms of Terbium and Dysprosium in a sequential arrangement of alternating layers. In other embodiments, a ferromagnetic shape alloy, a magnetic shape memory alloy, a magnetostrictive alloy (examples including Terfenol, cobalt ferrite, and Metglass), a magneto-mechanical alloy, a super-elastic alloy or combinations thereof may be distributed within one or more energy dissipating layers 3-10 or completely comprise individual energy dissipating layers 3-10.

The outer most energy dissipating layer 7 along the first L-shaped bracket 1 and outermost energy dissipating layer 6 along the second L-shaped bracket 2 are bonded together via a bond layer 11 to construct the C-mount isolator 20. While a variety of bond materials are applicable to the present invention, it was preferred for the bond layer 11 to be a fiber-reinforced elastomer adhered to the respective energy dissipating layers 6, 7 via methods understood in the art. The bond layer 11 is desired to be sufficiently stiff to maintain the C-shape of the C-mount isolator 20 without compromising the elastomeric damping properties of the bond layer 11.

Figure 2:
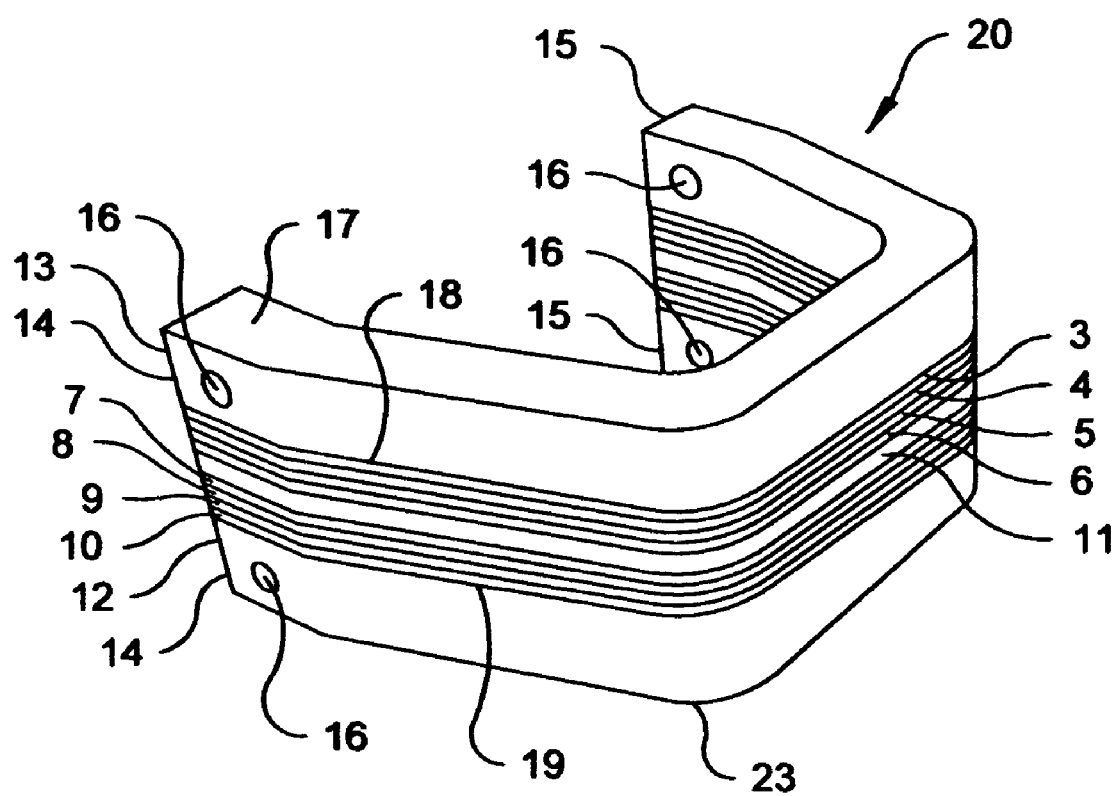
FIG. 2 is a perspective view of another embodiment of the present invention including a plurality of layers composed of two or more energy dissipating materials disposed about a bond layer and between two C-shaped mounts.

Referring now to FIG. 2, a C-mount isolator 20 is shown for an alternate embodiment of the present invention including a plurality of energy dissipating layers 3-10 which completely bisect the C-mount isolator 20 along the length of the C-mount isolator 20. Although eight energy dissipating layers 3-6 and 7-10 are shown disposed about the bond layer 11 in FIG. 1, embodiments may include two or more such layers.

The C-mount isolator 20 comprises a first C-shaped bracket 12 and a second C-shaped bracket 13 with two or more energy dissipating layers 3-10 and a bond layer 11 disposed there between. First and second C-shaped brackets 12, 13 are arranged side by side in a symmetric fashion about the energy dissipating layers 3-10 and bond layer 11 to achieve a single C-shape profile.

Energy dissipating layers 3-6 and 7-10 are applied onto the first C-shaped bracket 12 and second C-shaped bracket 13, respectively, via methods understood in the arts. The first C-shaped bracket 12 includes a generally planar second side 19 and a generally planar first side 23. One or more energy dissipating layers 7-10 are deposited and adhered onto the second side 19, as represented in FIG. 2, so as to form one or more generally planar layers having the planar extents of and extending above the second side 19. The second C-shaped bracket 13 includes a generally planar first side 17 and a generally planar second side 18. One or more energy dissipating layers 3-6 are deposited and adhered onto the second side 18, as represented in FIG. 2, so as to form one or more generally planar layers having the planar extents of and extending above the second side 18. As such, energy dissipating layers 3-10 completely bisect the C-mount isolator 20 lengthwise through the thickness of the first and second C-shaped brackets 12, 13.

The outer most energy dissipating layer 7 along the first C-shaped bracket 12 and outermost energy dissipating layer 6 along the second C-shaped bracket 13 are bonded together via a bond layer 11 to construct the C-mount isolator 20. While a variety of bond materials are applicable to the present invention, it was preferred for the bond layer 11 to be a fiber-reinforced elastomer adhered to the respective energy dissipating layers 6, 7 via methods understood in the art. The bond layer 11 is desired to be sufficiently stiff to maintain the shape and integrity of the C-mount isolator 20 without compromising the elastomeric damping properties of the bond layer 11 at higher frequencies.

Energy dissipating layers 3-10 may be composed of one or more elemental or alloy materials sequentially layered to form a rigid structure which extends from the second sides 18, 19 of the first and second C-shaped brackets 12, 13. For example, energy dissipating layers 3-10 are preferred to be composed of rare earth materials in either elemental or alloy form. In other embodiments, preferred embodiments of the present invention may include elemental forms of Terbium and Dysprosium in a sequential arrangement of alternating layers. In yet other embodiments, a ferromagnetic shape alloy, a magnetic shape memory alloy, a magnetostrictive alloy (examples including Terfenol, cobalt ferrite, and Metglass), a magneto-mechanical alloy, a super-elastic alloy or combinations thereof may be distributed within one or more energy dissipating layers 3-10 or completely comprise individual energy dissipating layers 3-10.

Figure 4:
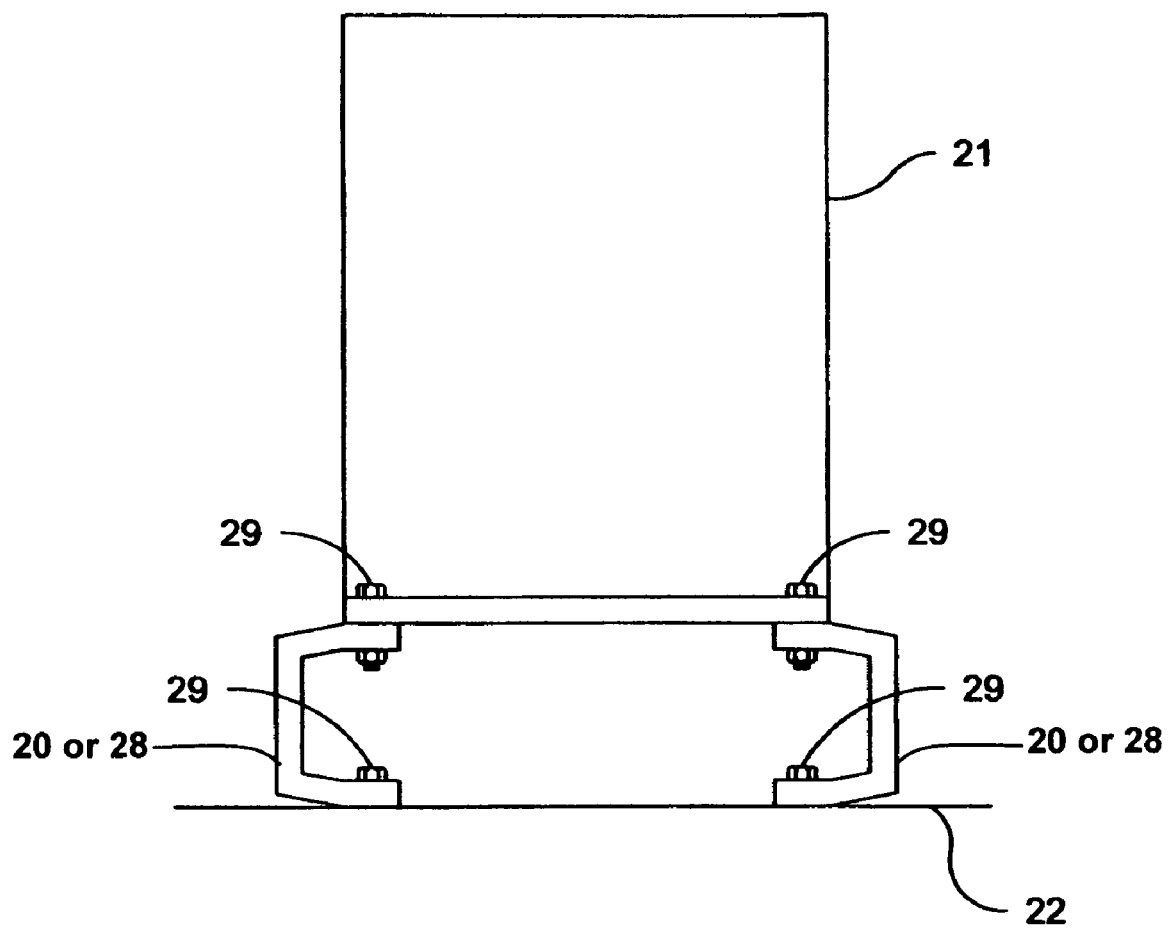
FIG. 4 is a schematic diagram showing an exemplary arrangement of shock-vibration mounts attached to and disposed between a shipboard component and a mounting surface.

First and second L-shaped brackets 1, 2 in FIG. 1 and first and second C-shaped brackets 12, 13 in FIG. 2 are preferred to include one or more holes 16, formed by methods understood in the art, which traverse the thickness of the C-mount isolator 20. Preferably, holes 16 should allow for the passage of a fastener 29 or the like to secure the C-mount isolator 20 between and to a mounting surface 22 and a shipboard component 21, as shown in FIG. 4. Thickness and relative modulus of the first and second L-shaped brackets 1, 2, first and second C-shaped brackets 12, 13, energy dissipating layers 3-10, and bond layer 11 are design dependent and chosen to maximize coupling of elastic energy in shocks and vibrations into heat and magnetic energies within the damping materials.

Figure 3:
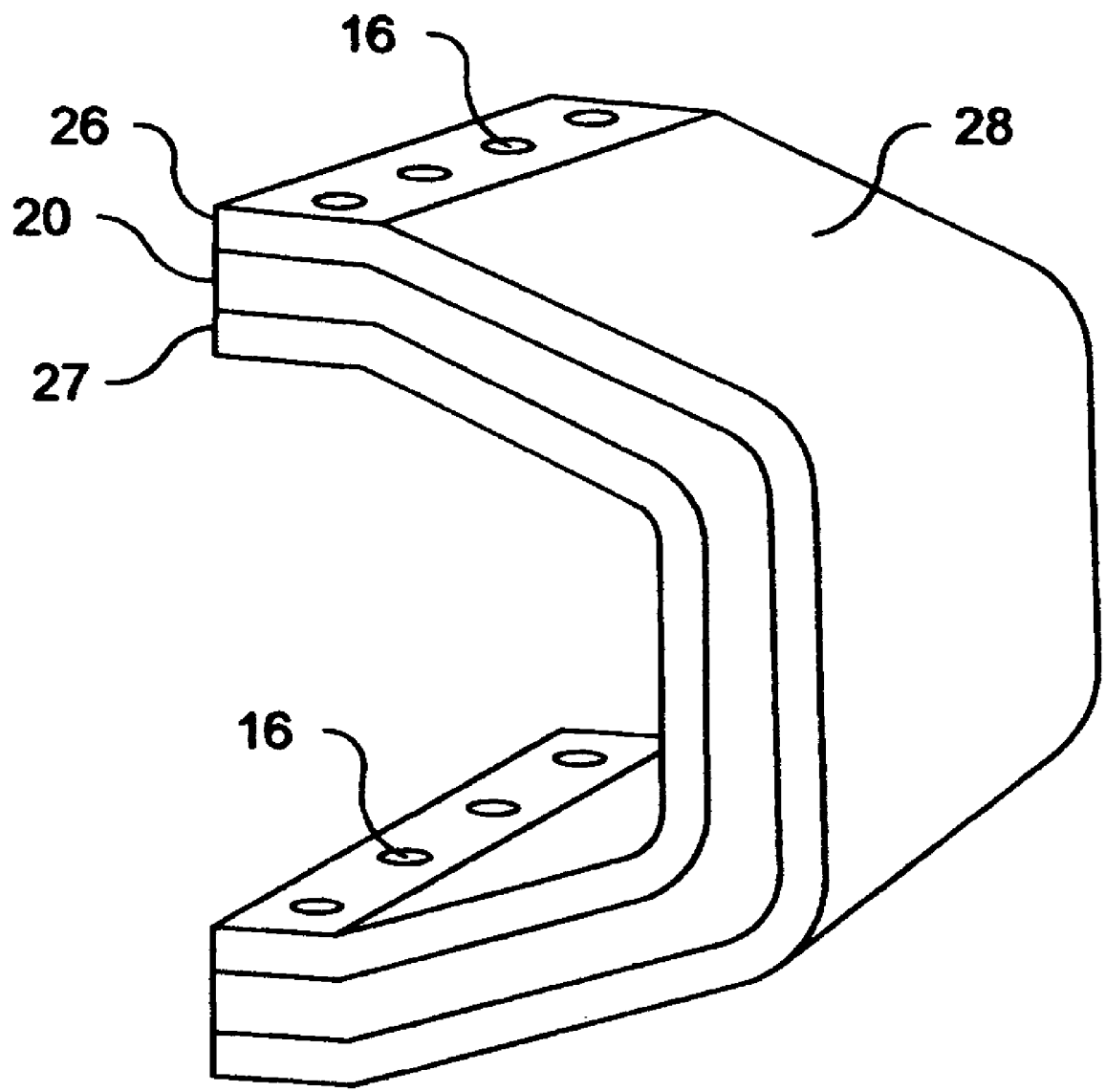
FIG. 3 is a perspective view of a laminate embodiment of the present invention wherein the C-shaped mounts shown in FIGS. 1-2 are constrained by two outer layers.

Referring now to FIG. 3, a laminate C-mount isolator 28 is shown composed of a C-mount isolator 20, as shown in FIG. 1 or FIG. 2, disposed between and constrained by a first outer layer 26 and a second outer layer 27. It is preferred for the first and second outer layers 26, 27 to cover the C-mount isolator 20, as represented in FIG. 3.

First outer layer 26 and second outer layer 27 are composed of an energy absorbing material capable of withstanding repeated deflections and strains, examples including metals, thermoplastics, and fiber-reinforced thermoplastics. First and second outer layers 26, 27 are mechanically fastened to the C-mount isolator 20 via rivets or the like or adhesively bonded to the C-mount isolator 20 via an epoxy or the like.

The C-mount isolator 20, as described above, dissipates shocks and vibrations by converting mechanical deflections to either heat or magnetic energy. First and second outer layers 26, 27 likewise dissipate shock and vibrations, as well as communicate shocks and vibrations into the C-mount isolator 20 for dissipation. The laminate C-mount isolator 30 is preferred to include one or more holes 16 which transverse the thickness of the first and second outer layers 26, 27 and C-mount isolator 20. Holes 16 should allow for the passage of a fastener 29 or the like to secure the C-mount isolator 20 between and to a mounting surface 22 and a shipboard component 21, as shown in FIG. 4.

Referring now to FIG. 4, C-mount isolators 20 described herein are shown secured between a shipboard component 21, examples including electronics cabinets, appliances, and machinery, and a mounting surface 22, one example being a bulkhead. Accordingly, C-mount isolators 20 are preferred to be structurally rigid to support the static load applied by the shipboard component 21 thereto. Likewise, C-mount isolators 20 are preferred to withstand repeated deflections and strains applied thereto caused by sea state conditions and/or operation of the shipboard component 21. As such, both first and second L-shaped bracket 1, 2 in FIG. 1 and first and second C-shaped bracket 12, 14 in FIG. 2 are preferred to be composed of a metal, one example being spring steel, or a thermoplastic, one example being a fiber-reinforced composite. It is readily apparent from the description above that the laminate C-mount isolator 28 may also be secured between a shipboard component 21 and mounting surface 22 as provided in FIG. 4.

The description above indicates that a great degree of flexibility is offered in terms of the invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A passive isolator for shock and vibration isolation comprising:
   (a) a pair of L-shaped brackets capable of withstanding repeated deflections and strains, each said L-shaped bracket having a first end and a second end;
   (b) at least two energy dissipating layers, at least one said energy dissipating layer disposed along said first end of each said L-shaped bracket, each said energy dissipating layer composed of a rare earth element, a rare earth alloy, a ferromagnetic shape alloy, a magnetic shape memory alloy, a magnetostrictive alloy, a magneto-mechanical alloy, a super-elastic alloy, or a combination thereof; and
   (c) a bond layer disposed between and adhering the outermost said energy dissipating layer along one said L-shaped bracket to the outermost said energy dissipating layer along the other said L-shaped bracket so that said passive isolator is C-shaped, said energy dissipating layers and said bond layer completely bisecting said passive isolator widthwise through the thickness of said passive isolator.

2. The passive isolator of claim 1, wherein said passive isolator is constrained between and attached to a pair of outer layers capable of withstanding repeated deflections and strains.

3. The passive isolator of claim 2, wherein said pair of outer layers are a metal or a fiber-reinforced thermoplastic.

4. The passive isolator of claim 1, wherein said L-shaped brackets are composed of spring steel.

5. The passive isolator of claim 1, wherein said L-shaped brackets are composed of a fiber-reinforced thermoplastic.

6. The passive isolator of claim 1, wherein said second end of each said L-shaped bracket having at least one hole adjacent thereto for attachment to a mounting surface or a component via a fastener.

7. A passive isolator for shock and vibration isolation comprising:
   (a) a pair of C-shaped brackets capable of withstanding repeated deflections and strains, each said C-shaped bracket having a first end, a second end, a first side, and a second side;
   (b) at least two C-shaped energy dissipating layers, at least one said C-shaped energy dissipating layer disposed along said second side of each said C-shaped bracket, each said C-shaped energy dissipating layer is composed of a rare earth element, a rare earth alloy, a ferromagnetic shape alloy, a magnetic shape memory alloy, a magnetostrictive alloy, a magneto-mechanical alloy, a super-elastic alloy, or a combination thereof; and
   (c) a C-shaped bond layer disposed between and adhering the outermost said C-shaped energy dissipating layer along one said C-shaped bracket to the outermost said C-shaped energy dissipating layer along the other said C-shaped bracket so that said C-shaped brackets are disposed in a side-by-side arrangement, said C-shaped energy dissipating layers and said C-shaped bond layer completely bisecting said passive isolator lengthwise through the thickness of said passive isolator.

8. The passive isolator of claim 7, wherein said passive isolator is constrained between and attached to a pair of outer layers capable of withstanding repeated deflections and strains.

9. The passive isolator of claim 8, wherein said pair of outer layers are a metal or a fiber-reinforced thermoplastic.

10. The passive isolator of claim 7, wherein said C-shaped brackets are composed of a fiber-reinforced thermoplastic.

11. The passive isolator of claim 7, wherein said C-shaped brackets are composed of spring steel.

12. The passive isolator of claim 7, wherein each said first end and each said second end of each said C-shaped bracket having at least one hole adjacent thereto for attachment to a mounting surface or a component via a fastener.

* * * * *